United States Patent
Walzer et al.

(10) Patent No.: US 12,505,082 B2
(45) Date of Patent: Dec. 23, 2025

(54) METHOD OF PROCESSING DATA IN A DATABASE

(71) Applicant: Singlestore, Inc., San Francisco, CA (US)

(72) Inventors: Robert Walzer, San Francisco, CA (US); Xiening Dai, San Francisco, CA (US)

(73) Assignee: SingleStore, Inc., San Francisco, CA (US)

( * ) Notice: Subject to any disclaimer, the term of this patent is extended or adjusted under 35 U.S.C. 154(b) by 67 days.

(21) Appl. No.: 18/076,898

(22) Filed: Dec. 7, 2022

(65) Prior Publication Data

US 2024/0193142 A1    Jun. 13, 2024

(51) Int. Cl.
*G06F 16/22* (2019.01)
*G06F 16/245* (2019.01)

(52) U.S. Cl.
CPC .......... *G06F 16/221* (2019.01); *G06F 16/245* (2019.01)

(58) Field of Classification Search
CPC .............................. G06F 16/221; G06F 16/245
See application file for complete search history.

(56) References Cited

U.S. PATENT DOCUMENTS

| | | | | |
|---|---|---|---|---|
| 9,619,502 | B2* | 4/2017 | Klauke | G06F 16/2393 |
| 2013/0166553 | A1* | 6/2013 | Yoon | G06F 16/245 |
| | | | | 707/E17.089 |
| 2016/0125021 | A1* | 5/2016 | Birka | G06F 16/23 |
| | | | | 707/692 |
| 2017/0109416 | A1* | 4/2017 | Dash | G06F 16/248 |
| 2019/0197026 | A1* | 6/2019 | Lahiri | G06F 16/21 |
| 2020/0293545 | A1* | 9/2020 | Li | G06F 16/2282 |
| 2020/0320048 | A1* | 10/2020 | Horn | G06F 16/2291 |
| 2021/0089537 | A1* | 3/2021 | Hanson | G06F 16/2282 |
| 2021/0182250 | A1* | 6/2021 | Zhu | G06F 16/284 |
| 2021/0200736 | A1* | 7/2021 | Luo | G06F 16/254 |
| 2021/0209088 | A1* | 7/2021 | Zheng | G06F 16/2455 |
| 2023/0072930 | A1* | 3/2023 | Shah | G06F 11/3419 |
| 2023/0138283 | A1* | 5/2023 | Henkes | G06F 16/2282 |
| | | | | 707/714 |
| 2023/0139988 | A1* | 5/2023 | Ma | G06F 16/221 |
| | | | | 707/705 |
| 2023/0161744 | A1* | 5/2023 | Abbasi | G06F 16/2255 |
| | | | | 707/747 |

(Continued)

OTHER PUBLICATIONS

International Search Report and Written Opinion dated Mar. 15, 2024 for PCT Application No. PCT/US2023/082317.

(Continued)

*Primary Examiner* — Alicia M Willoughby
(74) *Attorney, Agent, or Firm* — EIP US LLP

(57) ABSTRACT

Disclosed herein is a computer-implemented method of storing data items arranged in a plurality of columns and a plurality of rows. In some examples the method comprises storing the data items in a segment of persistent storage having a columnstore comprising one or more column files to store the data items column by column, storing the data items in a rowstore in the segment, the rowstore comprising one or more row files to store the data items row by row, and storing a segment index in the segment, the segment index indicating a location in a said column file of the columnstore and a said row file of the rowstore for at least some of the data items.

18 Claims, 11 Drawing Sheets

(56) References Cited

U.S. PATENT DOCUMENTS

2023/0394017 A1* 12/2023 Terlecki ................ G06F 16/221

OTHER PUBLICATIONS

"In-Memory col. Store Architecture", Oracle Database In-Memory Guide, 12c Release 2 (12.2) Nov. 2021.
Huang et al., "TiDB: a Raft-based HTAP database", Sep. 14, 2020, Proceedings of the VLDB Endowment, vol. 13, pp. 3072-3084 https://doi.org/10.14778/3415478.3415535.
Chen et al., "ByteHTAP: bytedance's HTAP system with high data freshness and strong data consistency", Sep. 29, 2022 Proceedings of the VLDB Endowment, vol. 15, pp. 3411-3424 https://doi.org/10.14778/3554821.3554832.

* cited by examiner

METHOD OF PROCESSING DATA IN A DATABASE

BACKGROUND

Technical Field

The present application relates to processing data in a database and, more specifically, methods and systems for storing, manipulating and querying data items which are logically arranged in a plurality of columns and a plurality of rows.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to carry out transactional or analytical processing by submitting a "query" or calling one or more functions in a query language for searching, organizing, retrieving, loading and/or manipulating information stored within a respective database.

Certain database table or record set structures, also known as access methods, are designed to store data in accordance with how the data is going to be used. Two examples of different database access method designs are rowstore tables and columnstore tables. Typically, rowstore tables are used for online transaction processing (OLTP) workloads and columnstore tables are used for online analytical processing (OLAP) workloads. However, sometimes both transactional processing and analytical processing are required.

SUMMARY

According to a first aspect of the present disclosure there is provided a computer-implemented method of storing data items arranged in a plurality of columns and a plurality of rows. In an example, the method comprises storing the data items in a segment of persistent storage having a columnstore comprising one or more column files to store the data items column by column, storing the data items in a rowstore in the segment, the rowstore comprising one or more row files to store the data items row by row, and storing a segment index in the segment, the segment index indicating a location in a said column file of the columnstore and a said row file of the rowstore for at least some of the data items.

This integrated approach to storing data items in both columnstore and rowstore format improves synchronization between the two formats allowing query and other processing to be performed on either format with low overhead compared with employing columnstore and rowstore in separate systems. Both formats can be used for query and other processing with a selection being made dynamically at runtime. Additionally, the selection of columnstore or rowstore may be made by segment, for example depending on selectivity.

In a second aspect there is provided a non-transitory computer readable storage medium comprising computer-readable instructions which, when executed by a processor, cause the processor to store data items arranged in a plurality of columns and a plurality of rows in a segment of persistent storage having a columnstore comprising one or more column files to store the data items column by column, store the data items in a rowstore in the segment, the rowstore comprising one or more row files to store the data items row by row, and store a segment index in the segment, the segment index indicating a location in a said column file of the columnstore and a said row file of the rowstore for at least some of the data items.

According to a third aspect of the present disclosure there is provided a database system comprising at least one processor, persistent storage, volatile memory and computer program code. The computer program code being configured to, with the at least one processor, cause the database system to: store data items arranged in a plurality of columns and a plurality of rows in the segment in a columnstore comprising one or more column files to store the data items column by column; store the data items in a rowstore in the segment, the rowstore comprising one or more row files to store the data items row by row; and store a segment index in the segment, the segment index indicating a location in a said column file of the columnstore and a said row file of the rowstore for at least some of the data items.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION OF CERTAIN EMBODIMENTS

Figure 1:
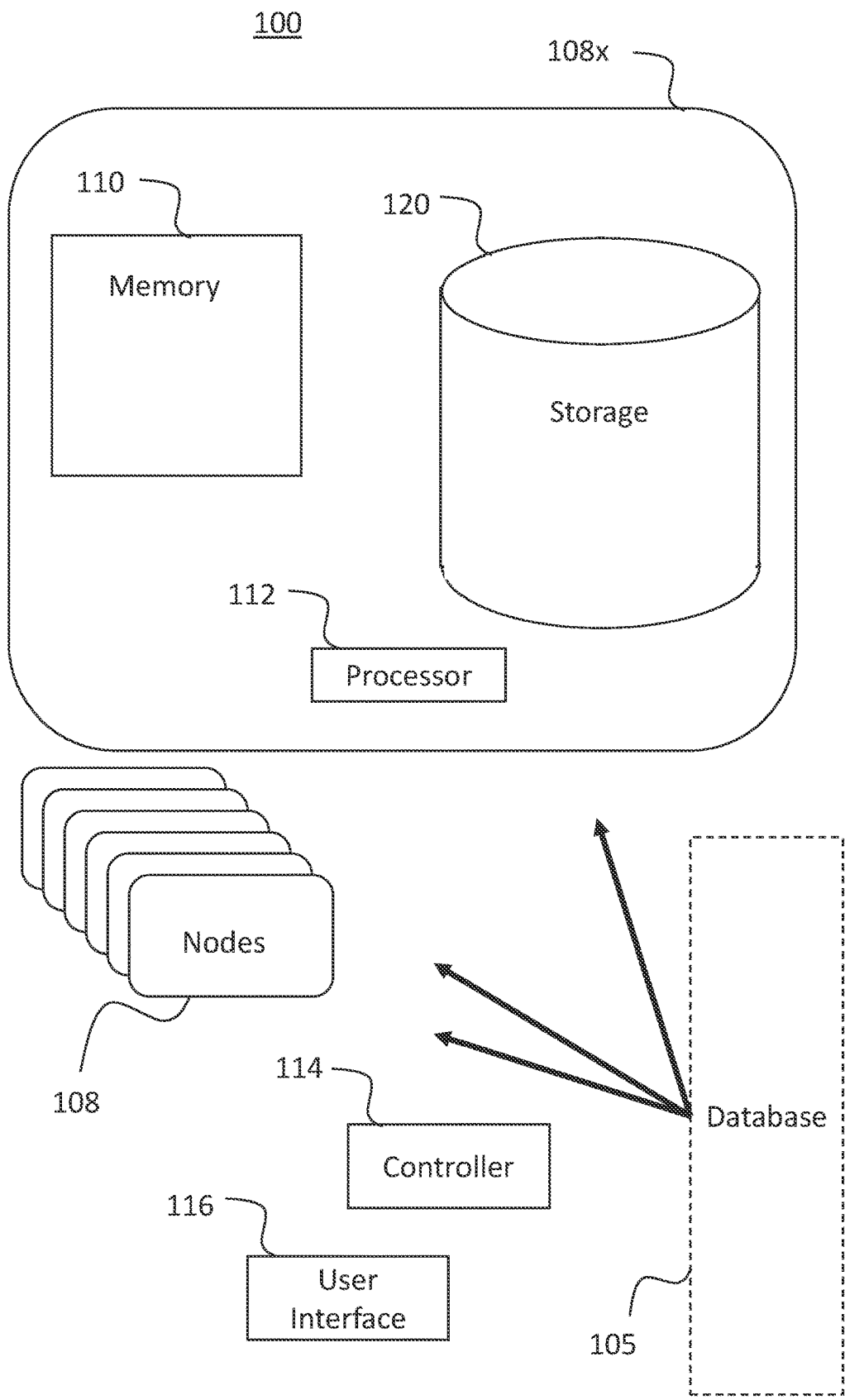
FIG. 1 is a schematic diagram illustrating a distributed database management system, according to an example.

FIG. 1 shows an example distributed database management system 100 according to an example. The database 105 may be distributed onto a number of nodes 108, 108x as part of a database cluster. The data items of the database 105 may be distributed and managed in any suitable fashion by a controller 114, such as horizontally sharded using a shard key. Alternatively, the database 105 may be implemented on a single node. A user interface 116 allows users to access data items in the database, including processing queries and loading new data items. The processing of queries may simply result in a collection of data items matching one or more search parameters defined in the query, and/or the query may result in changes or updates to all or some of those matching data items.

Some details for a representative node 108x are shown and may comprise a processor 112, volatile memory 110 such as RAM, persistent storage 120 such as magnetic disk storage systems other non-volatile memory such as ROM, disk partition, flash memory and solid-state devices. The database or database shard may be stored in one or both of the volatile memory 110 and the storage 120. The volatile memory 110 may be used for temporarily holding and manipulating of data items from the database and may include a buffer cache where data items from the persistent storage are cached for updating or for query execution. The non-volatile or persistent storage 120 may store computer programs used to control the cache and database items stored in the memory 110 and storage 120. The persistent storage 120 may be used to store query plans permanently or for long periods spanning restarts. The persistent storage may be used to store a code base for storing compiled functions which may be reused for later user queries.

Data items are often arranged logically in a relational database comprising a number of tables each comprising a plurality of columns and a plurality of rows. Each table optionally comprises a primary key which is a unique identifier of a row and each row can be used to create a relationship between different tables using a foreign key which is a reference to a primary key of another table. These arrangements allow data items to be organized in a way that facilitates updating or adding data items as well as querying the data items in a fast and efficient manner whilst at the same time maintaining the integrity of the data items, including robustness against external events such as hardware failure. Where data items are stored in two places at once, for example in persistent storage and volatile memory, synchronicity should be maintained between these different representations of the same data item.

Whilst accessing data items in persistent storage is slower than accessing data items in volatile memory—due to storage hardware input-output or I/O operations—storing and interacting with the data items in the persistent storage 120 provides a number of benefits, especially for large databases that may comprise billions of rows. These include more robust maintenance of the integrity of the data items as well as improved robustness against hardware failures. Furthermore, in database management systems that rely on volatile memory 110 for accessing data items, the data items must first be first loaded from storage 120 into memory 110 and indexes and other support data structures must then be built for proper operation of the database management system. In addition, the volatile memory is often insufficient to accommodate all items in a large database. Therefore, there is additional operating overhead to determine which data items to load into volatile memory from persistent storage and to ensure the data items are synchronized between the storage 120 and memory 110. This introduces additional complexity for the database management system, additional failure points, and may limit performance in some situations.

Whilst data items may be logically arranged in a relational database 105, their physical storage in memory 110 and/or storage 120 requires the allocation of respective physical volatile memory and/or persistent storage addresses and/or locations as well as the implementation of data encoding, data compression and other hardware dependent factors. Because of this, data items are often stored in one of two formats, rowstore and columnstore. Rowstore format involves data items in a table being physically loaded into memory or storage in a sequential row-by-row format. That is, the data items of one row are loaded sequentially into memory or storage locations, then the data items of the next row are loaded sequentially into the next memory or storage locations in the sequence, and so on. In columnstore format, it is the data items of the columns that are loaded sequentially into memory or storage locations then the data items of the next column are loaded sequentially into the next memory or storage locations. Rowstore formats are optimized for transaction processing, that is quickly adding, updating, or seeking to data items single row at a time. Columnstore format is optimized for analytics, that is quickly performing searching of the data items. Some attempts have been made at hybrid systems however these typically involve maintaining independent rowstore and columnstore systems, one of which can then be selected dependent on a current task. However, interaction between two independent systems with different operating systems and hardware configurations and potentially query semantics is complicated to manage and slow, impacting on synchronization between data items as well as system performance.

Figure 2:
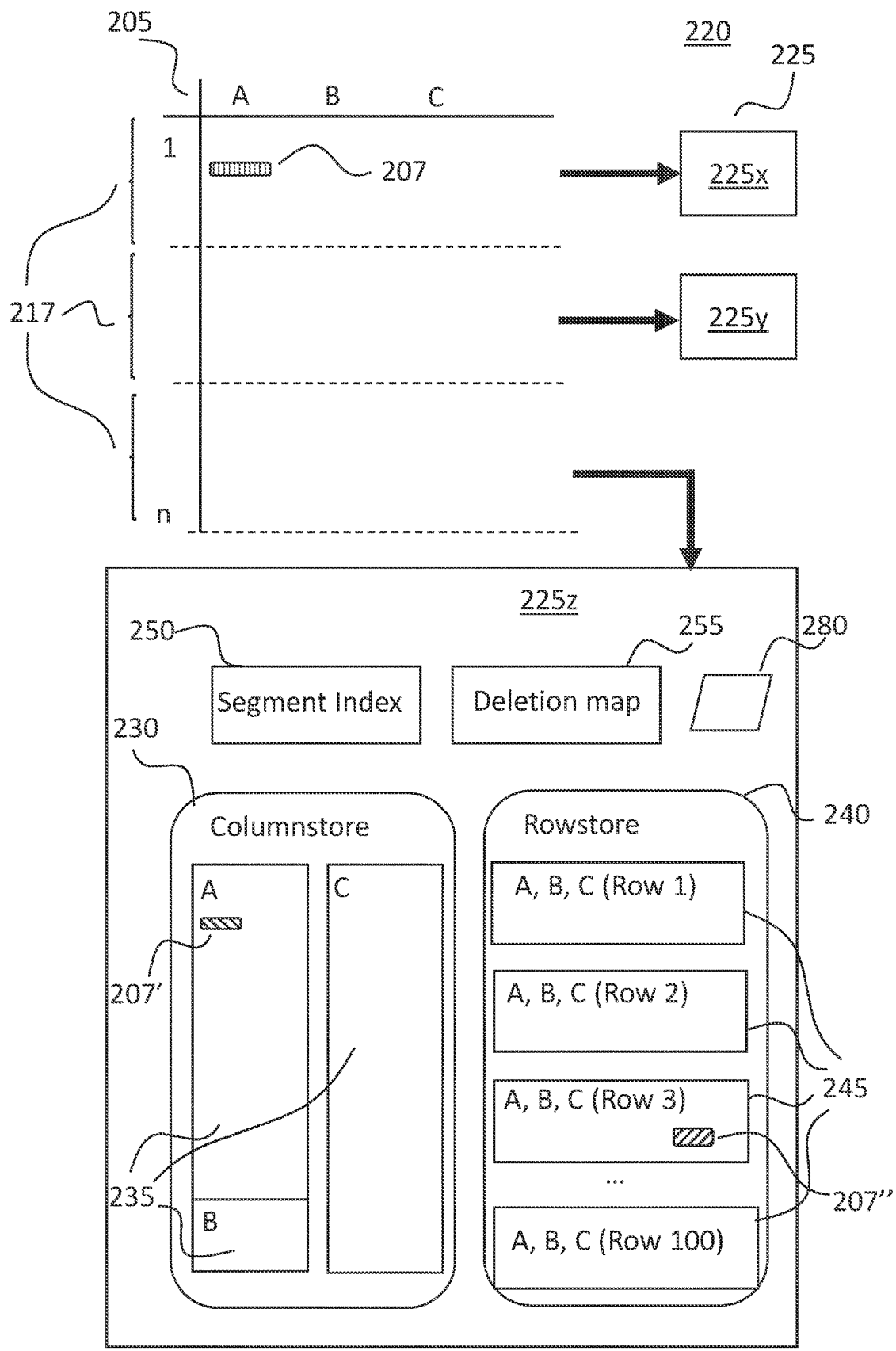
FIG. 2 is a schematic diagram illustrating storage of data items into storage segments, according to an example.

FIG. 2 illustrates how data items of a database table 205 are stored in segments 225x, 225y, 225z of non-volatile storage 220, according to an example. The table 205 comprises data items arranged in a plurality of columns A-C and a plurality rows 1-n. A data item is a logically separable and addressable portion or piece of data such as a number, a sequence of text, a formula or equation, a figure, a sequence of ASCII characters, an image, a video file, fields comprising information such as first and last names, age, address—a representative data item 207 is illustrated. Each column of a row comprises a data item, which may include a null value or empty indicator. Groups 217 of rows of data items may be stored in respective segments 225x-225z of storage. Whilst for simplicity only a small number of columns and rows are illustrated, in practice the number of columns A-C may be in the order of 10-1000 and the number of rows n may be in the order of 1 billion to 1 trillion. The table 205 may be distributed or sharded horizontally in which data elements from one or more groups of rows 217 and all columns A-C of these rows are stored in respective nodes 108.

Each node 108 may comprise non-volatile storage 120 partitioned into blocks or segments 225. This partitioning into segments 225 of non-volatile or persistent storage is generally related to characteristics of the hardware used in the node, such as the range of the number that is used to access the blocks of non-volatile storage elements (eg 64K byte blocks), or a multiple of the number of bytes that are provided with each disk read. Each segment 225 may contain thousands of addressable blocks. Each segment may be capable of storing up to 1 million rows and a large database may require millions of segments to store all of its data items.

The architecture of one of the segments 225z of persistent storage according to an example is illustrated. Other segments 225x, 225y of a node's storage 120 may comprise the same or a similar architecture. The segment 225z comprises a columnstore 230 and a rowstore 240 for storing the data items 207 of the database 205. The segment 225z also comprises a segment index 250, a deletion map 225 and may comprise one or more separate files 280 for storing individual data items over a determined size—for example an image, text from the body of an email, or a video clip.

The columnstore 230 comprises one or more column files 235 for storing columns A-C of data items of the database in a column-by-column format. That is the data items of one column of one group of rows 217 are stored in a series of storage locations in physical storage, then the data items of the next column in the same group of rows 217 are stored in the next series of storage locations and so on until all of the data items in the group of rows are stored in the segment. The locations may correspond to the addresses of respective blocks of addressable storage or they may be logical locations which point to where the respective data item is physically stored in the segment. The next segment will similarly store data items from the next group of rows 217 in the same column by column format. The data items from each column of a group of rows 217 may be stored in a single column file 235. The data items in each column file 235 may be encoded and compressed and will have a location within the column file dependent on the encoding and compression used. The encoding and compression used may be dependent on the type of data item as well as their variability within the column, and may be optimized for minimizing the storage space required, optimizing query processing or lookup efficiency or other factors. Examples of encoding include dictionary encoding and run length encoding. The type of encoding used may also be dependent on the hardware used for storing the data items. An encoded, compressed and stored representation of data item 207 is illustrated as 207' in the first column file 235 of the columnstore 230. Each column A-C may be stored in a different column file 235, according to its own respective encoding and/or compression. However, in some situations it may be more efficient to store some columns in the same column file or a single column in more than one column file.

The rowstore 240 comprises one or more row files 245 for storing respective rows of data items of the database in a row-by-row format. That is the data items of one row of one group of rows 217 are stored in a row file 245 in a series of storage locations in physical storage, then the data items of the next row in the same group of rows 217 are stored in another row file in a next series of storage locations and so on until all of the data items in the group of rows are stored in the segment 225z. In the example illustrated, data items from rows 1-100 are stored in respective row files. The next segment will similarly store data items from the next group of rows 217 in the same row by row format, although the allocation of rows between row files may be different. Data item 207 is stored as 207" in the third row file and also as 207' in the first column file. The data items in each row file 235 may be encoded and compressed and may have a location within the row file dependent on the encoding and compression used—an offset may be maintained for each data item within a row file to enable fast look up as described in more detail below. The encoding and compression used may be dependent on the type of data items as well as the hardware used.

In an example, some or all data items may be stored in both the columnstore 230 and rowstore 240 of the respective segment 225z. Because data items 207 are stored in both a columnstore 230 and a rowstore 240 in the same segment 225z, a more integrated approach to maintaining the integrity of the data items can be achieved. In other words, many of the same hardware and logical processes can be applied to the data items irrespective of the format they are stored in.

This makes processing queries on the database simpler as it is not necessary to consider how to adapt such processing for independent storage systems and storage hardware. That data items are stored in columnstore and rowstore on the same segment also helps to ensure that the data items are synchronized as updates for both can be handled at the same time on the same segment.

Each segment 225z may also comprise a deletion map 255, such as a bitmap, which indicates which data items are no longer stored in the segment 225z. As explained in more detail below, when an already stored data item 207 is changed in or deleted from the database 205, the representation of this data items in the columnstore (207') and the rowstore (207") will no longer be accurate and the deletion map 255 is used to indicate which data items in the segment are no longer current and are now stored elsewhere. The database management system may then search for the data items elsewhere. This approach is used as it is not efficient to update data items in the segments each time they change, and instead new segments are generated periodically to store the updated data items.

The segment may also comprise one or more separate files 280 for storing large data items. Data items determined to be above a certain size may be stored as separate files 280. The data item representations 207' and 207" stored in the columnstore 230 and rowstore 240 may include pointers to the corresponding separate file 280, for example a BLOB (binary large object) file. This enables the column files 235 and row files 245 to be of an efficient and manageable size. Alternatively, large data items may only be stored in the column files with the corresponding data item representations 207" in the rowstore pointing to the corresponding data item representation 207' in the columnstore.

In an example, the segment also comprises a segment index 250 which points to the location of data items 207 in a column file 235 (207') and a row file 245 (207"). In one example, the data items may be stored in row order in the column files 235 and the segment index may comprise a row indicator. For example, the data items in the column file 245 for column A are stored sequentially from row 1 to row 100. Similarly, where columns B and/or C are indexed, data items are stored in row order with their respective segment index including a row indicator for each data item. This compares with other possible orders for storing data items such as having the rows ordered by a key which may make processing of certain types of common queries faster. By ordering data items in both the rowstore and the columnstore by row number or indicator, this row indicator may be used as the index for a data item in both the columnstore 230 and the rowstore 240; as can be seen in more detail in FIG. 3. It is to be noted that, at the higher database table level, the table itself may be sorted on one of the columns resulting in a row order which is then used by the segments to store the data items of all rows allocated to the respective segments.

Figure 3:
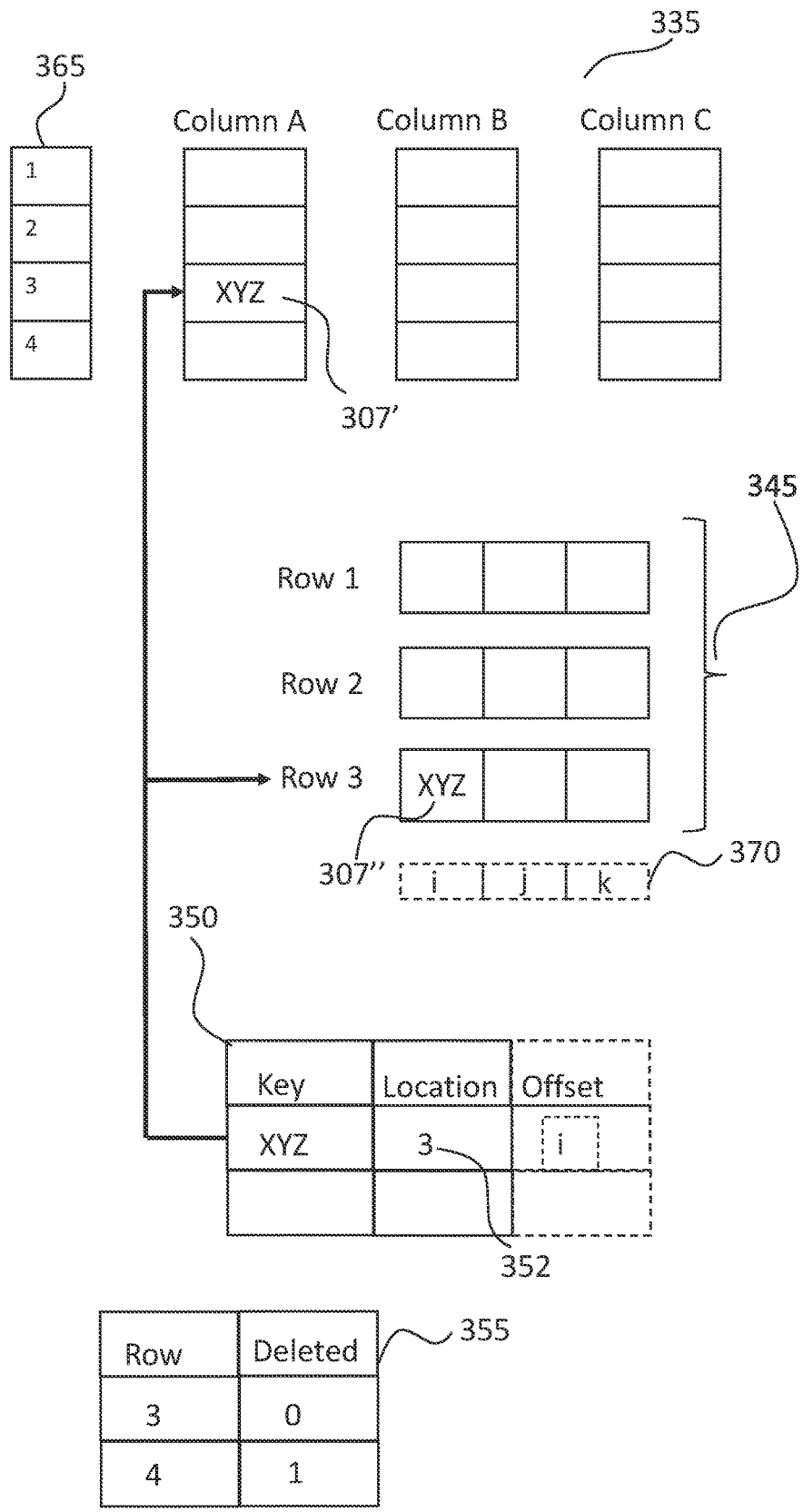
FIG. 3 is a schematic diagram illustrating storage of data items into a columnstore and a rowstore, according to an example.

FIG. 3 illustrates the storage of a data item "XYZ" in both a column file 335 (as 307') and a row file 345 (as 307"). A segment index 350 is provided for one or more column files—the segment index for Column A is illustrated—which comprises a key field together with a location field. Each data item—one example "XYZ" is illustrated—is paired with a location in the column file 335 for column A where the data item 307' is stored. The actual physical or hardware storage location or address will depend on the encoding and compression of the data items in the column file as well as the hardware used for storage. The location is also used to point to the row file 345 in which the data item is stored. The segment index 350 may include an offset which points to a location in the row file where the data item 307" can be found. As with the column file, the actual physical or hardware storage location or address will depend on the encoding and compression of the data items in the row file as well as the hardware used for storage. For example, the location may point to the storage address at the start of a row file 345 and the offset ("i" in the illustration) may indicate the number of incremental storage elements such as blocks to jump to in order to find the data item 307".

In an example, the location comprises a row indicator 352 which points to the row file containing the data item 307" as well as a location of the data item 307' in the column file 325. The location (e.g. "3") may be converted using an array, pointer file or other metadata 365 directly to the physical location or block address of the data item 307' in the column file. Using the same location reference or number, for example a row indicator 352, for both the columnstore and the rowstore storage of the same data item ensures that the rowstore and columnstore are tightly aligned so the risk of not being synchronized is significantly reduced or eliminated compared with trying to keep independently provisioned rowstores and columnstores synchronized. Further there is no need for monitoring and correction mechanisms for keeping the rowstore and columnstore synchronized as they are inherently synchronized by the approach of this example. In addition, higher level processes such as query processing do not need to be converted in different ways for independent columnstore and rowstore systems making the overall system simpler to operate with less checking and correction overhead. This also improves performance.

The segment index 350 may comprise a single location index for a single column file 335 which has a single "location" column containing location references 352 for respective keys or data items in both the columnstore and the rowstore—a common index. However, alternative arrangements are possible—for example there may be two indexes for each data item containing pointers or locations in the columnstore and the rowstore respectively. A single file may be used as a segment index to contain locations for data items in more than one column. The locations 352 may themselves be pointers to corresponding metadata files for the column and row files, which in turn map a location to a physical block number in the segment of storage for a corresponding data item in the columnstore and the rowstore.

All of these segment index implementations are written or stored at the same time as the data items are stored in the columnstore and rowstore, or at least in a similar time within the same storage process. The segment's column files and row files are then inviolable meaning that the physically stored data does not change, although the indexes and deletion map may change to reflect changes in the data items of the database stored across the many segments of the database management system. This means that a one-to-one mapping is maintained between the data items stored in the columnstore and in the row store of a particular segment, and which are both pointed to or located by the segment index. This keeps the two formats inherently synchronized without the need for synchronizing mechanisms and error identification and correction processes.

A simple deletion bitmap 355 is possible when using a segment index such as a row indicator or number 352. In this case the row indicator and a binary indicator of whether or not this has been deleted can be used. In the example illustrated, row 3 is marked as current and corresponds to storage of data items in this row whereas row 4 is marked as deleted (whether by actual deletion from the database or due to being updated and written to a new segment). If one data item in a row is changed or deleted, then the storage of the entire row, including all column values, is no longer current and so the row itself is marked as deleted.

Figure 4:
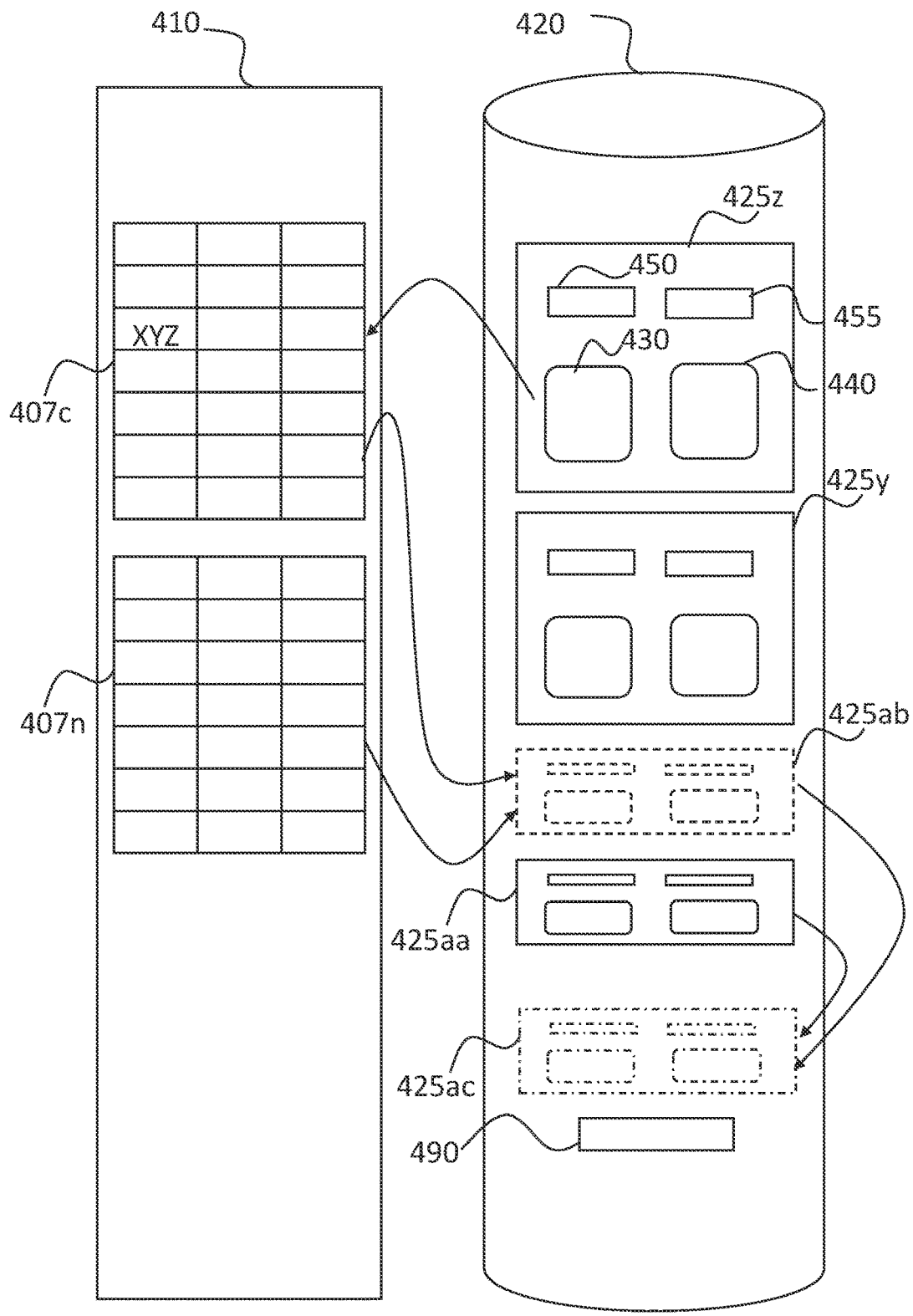
FIG. 4 is a schematic diagram illustrating manipulation and storage of data items in a columnstore and a rowstore, according to an example.

FIG. 4 illustrates an example of how volatile memory 410 and persistent storage 420 may be used in concert for operating a database management system 400. The persistent storage 420 stores data items in a plurality of segments 425y, 425z. Each segment comprises a columnstore 430, a rowstore 440, a segment index 455 and a deletion map 455 as previously described. When processing a query, data items may be identified in the persistent storage 420 according to search terms and transferred to volatile memory 410 for changing or deletion. The deletion maps 455 of each segment will be updated to indicate that these rows are no longer stored in these segments.

For example, a database comprising a table of customer details may be updated based on recent purchasing activity, say any customer purchasing more than a certain dollar value of products may be entitled to a discount on purchases for the next month. The query may identify such customers, move their customer records or rows to volatile memory where a discount code field can be updated. In the illustrated example, "XYZ" may correspond to such a customer. The updated customer records or rows are shown as a table of changed rows 407c.

The updated data items from this table 407c may then be stored back to the persistent storage 420 in a new segment 425ab. New data items 407n may be written to the volatile memory for example as a result of new customers. These new rows may be stored in persistent memory 420 as a new segment 425ab—this may be done together with the changed rows 407c or as part of a separate storing process. The storing of updated and/or new rows 407c, 407n may be done as part of a batch process, for example after a certain number of updated or new rows have accumulated in volatile memory and/or after a certain period of time.

Data items from the changed and/or new rows 407c, 407n may be stored in both columnstore and rowstore on the new segment 425ab. A segment index will be generated for the new segment, pointing to where the data items are stored in respective column files and row files as previously described. As the data items are stored in a columnstore and a rowstore in the same segment at the same time, synchronization between the data items is improved; in other words the two formats are tightly mapped. A deletion map will also be generated which can subsequently be updated to reflect inactivation of data items in the segment as they are further updated. Moving data items from the volatile memory 410 to the persistent storage 420 reduces the overhead of handling system crashes, by enhancing synchronicity as well as enabling fast restoration as the data items are already stored and synchronized in persistent storage. The loss of a relatively small number of rows in volatile memory can quickly be rectified compared with significant time and processing overhead for restoration of the entire database if fully stored on volatile memory.

Smaller segments 425ab, 425aa may be merged into a larger segment 425ac to reduce the overall number of segments in the persistent storage 420. This reduces management and query processing overhead. Also, the locking and merging of smaller segments has less impact on the performance of the database management system, for example by reducing the number of data items that are temporarily unavailable to queries.

The persistent storage 420 also comprises one or more primary or segment indexes 490 which point to the segment or segments in which certain data items can be found. This is updated when the segment in which a data item is stored is changed, for example when a data item is changed or segments are merged.

Figure 5:
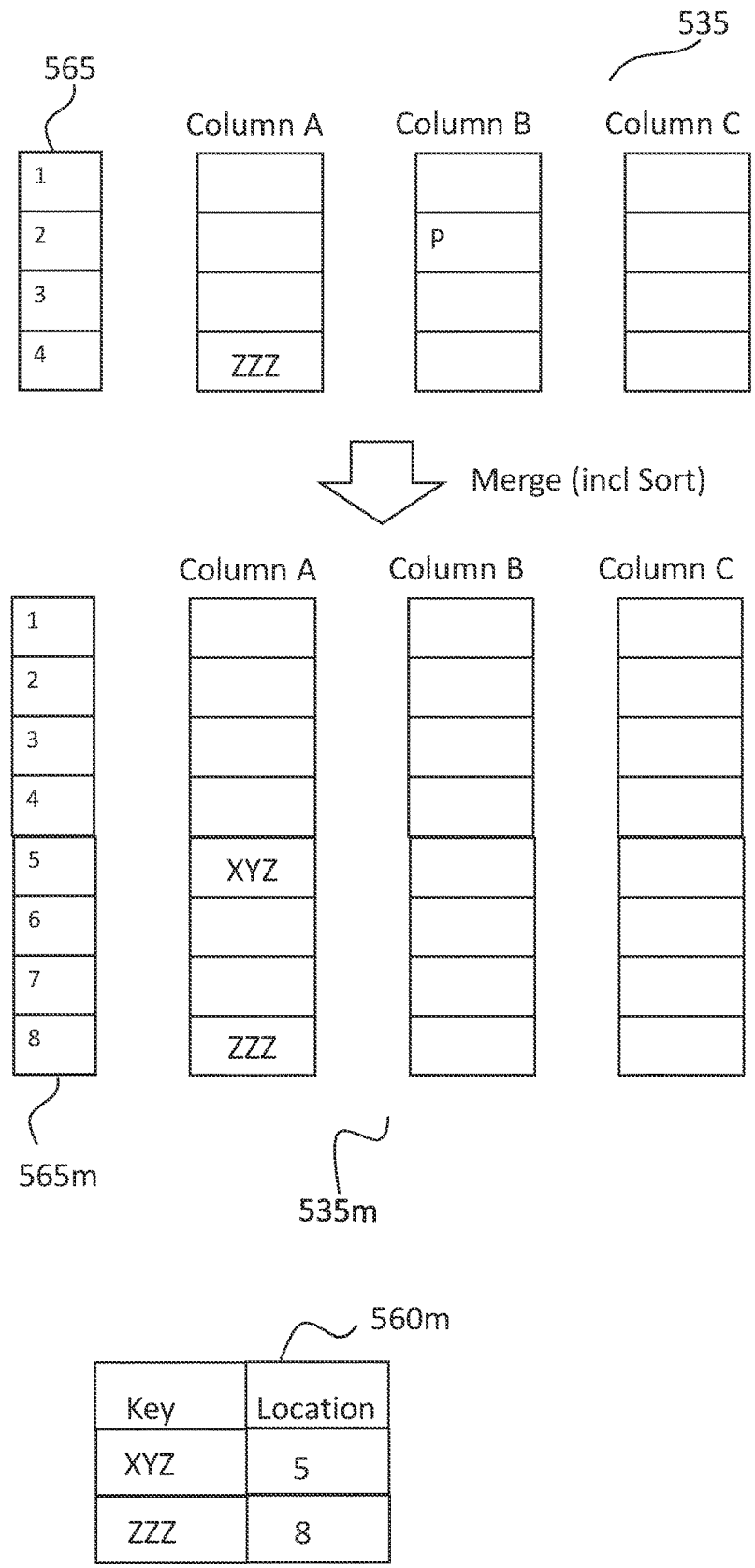
FIG. 5 is a schematic diagram illustrating merging of data items in columnstores of two storage segments, according to an example.
Figure 6:
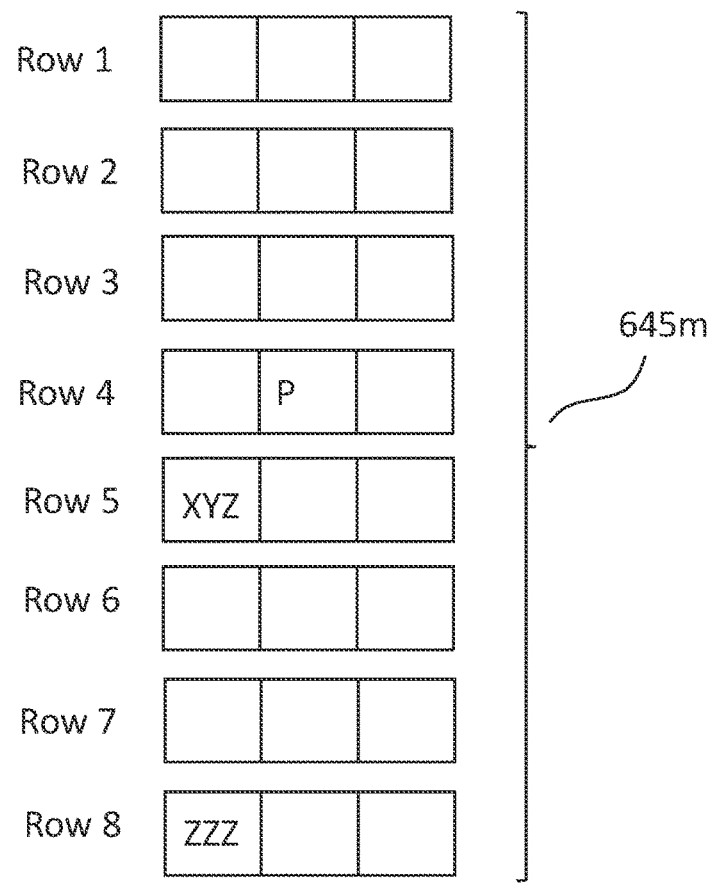
FIG. 6 is a schematic diagram illustrating merging of data items in rowstores of two segments, according to an example.

FIGS. 5 and 6 illustrate the merging of two segments according to an example. The columnstore 535 of a first segment is illustrated and comprises data item "ZZZ" at row 4 of column A of the columnstore. A pointer P to a separate file containing the data item for column B row 2. Array 565 illustrates the logical positions in the column files of the columnstore for data items in columns A-C. The segment comprising this columnstore is merged with another segment (not shown) resulting in a merged columnstore 535*m* in a new segment. The merging process involves adding the data items from one segment to data items from another segment and sorting these according to one of the columns—in this example column A. This results in a table of data items increasing from four to eight rows, with the rows sorted by Column A with ZZZ now at row 8 and a new example data item XYZ at row 5. For simplicity other data items are not explicitly shown, and the number of rows and columns in this example is very small to help illustrate operation of the merge according to the example. A merged array 565*m* indicates the location of the data items in the respective column files 535*m*. A segment index 560*m* for column A of the merged columnstore comprises row indicators for data items XYZ and ZZZ.

FIG. 6 illustrates merging of the row stores of the two segments into a new rowstore 645*m* comprising row files 645*m* for the 8 rows. It can be seen that XYZ is in the row file for row 5, ZZZ is in the row file for row 8, and the pointer P is in the row file for row 5. The segment index 560*m* pointing to data items XYZ, ZZZ (and other data items in column A) has been updated with an offset to the location in the row file for each data item. Depending on the encoding and compression, whether rows are concatenated in a single row file, and the order of the data items in the row file, the offset may be the same for data items in each column.

Figure 7:
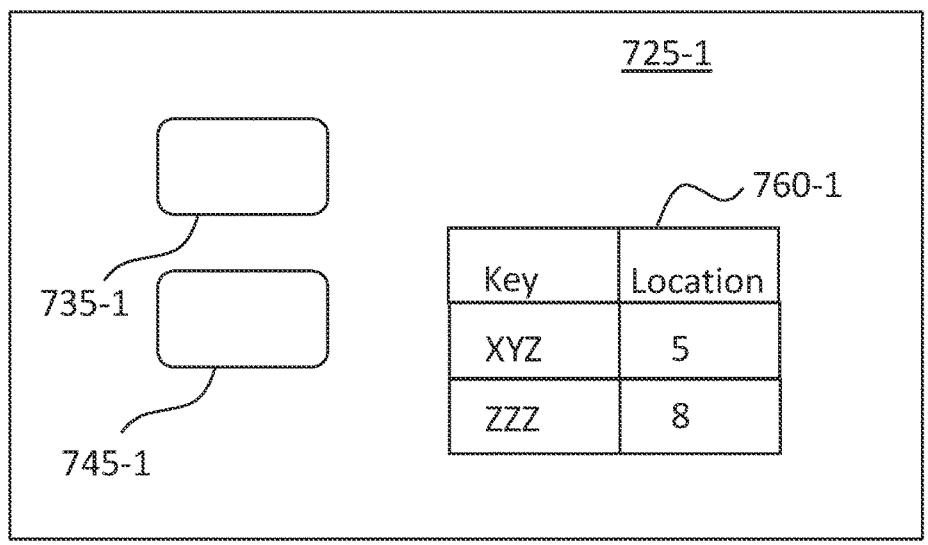
FIG. 7 is a schematic diagram illustrating storage of indexing data items stored in storage segments, according to an example.
Figure 7:
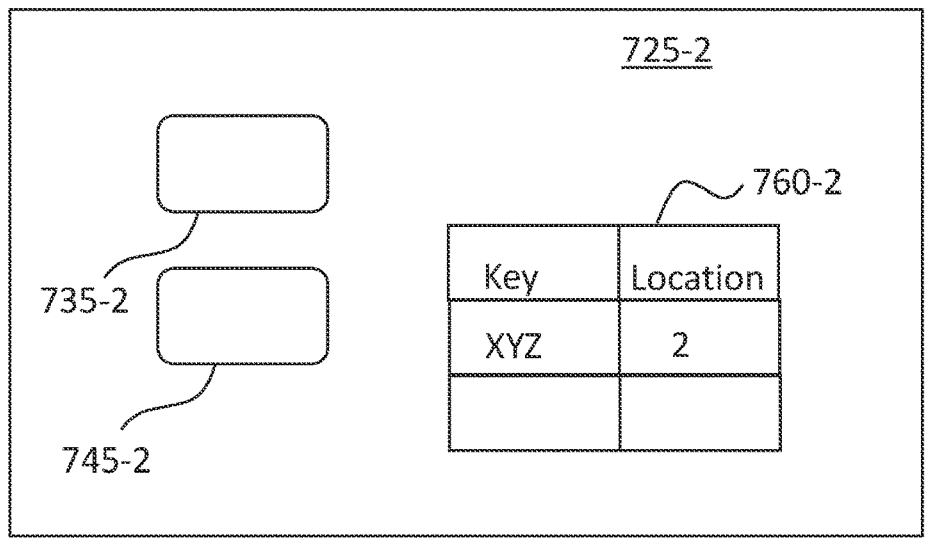

FIG. 7 illustrates the use of primary indexes 790 and secondary indexes 760-1, 760-2 for data items in persistent storage. Two segments 725-1 and 725-2 are illustrated, each comprising a respective columnstore 735-1, 735-2, a respective rowstore 745-1, 745-2 and a respective segment or secondary index 760-1, 760-2. The segment index 760-1 for the first segment 725-1 shows locations or row indicators for data items XYZ (row 5), ZZZ (8) in the columnstore 735-1 and rowstore 745-1. The segment index 760-2 for the first segment 725-2 shows a location or row indicator for data item XYZ (2) in the columnstore 735-2 and rowstore 745-2.

A primary index 790 comprises segment locations or identifiers indicating which segments the data items are stored in—for example data item XYZ is indicated as being in both segments 725-1, 725-2 (1,2) whilst data item ZZZ is indicated as only being in one segment 725-1 (2). This enables data items to be quickly located within the persistent storage by first checking the primary index 790 then checking the secondary or segment indexes within the segments pointed to by the primary index. The data item itself, and associated data items in the same row, can then quickly be located using the segment index for the respective segments pointed to by the primary index. The persistent storage may comprise a number of primary indices, for example pointing to data items in different columns.

Storing data items in both columnstore and rowstore formats enables a choice of how the data items may be found and retrieved from persistent storage. For example, a search may be performed using columnstore or rowstore depending on the selectivity of the search with respect to data items in a particular segment. For a high selectivity, it may be more efficient to use the columnstore to find the data items in a particular row and then retrieve the corresponding data items from their respective rows. On the other hand, where the selectivity of a particular segment is low, it may be more efficient to use the rowstore to retrieve data items from a small number of rows.

Figure 8:
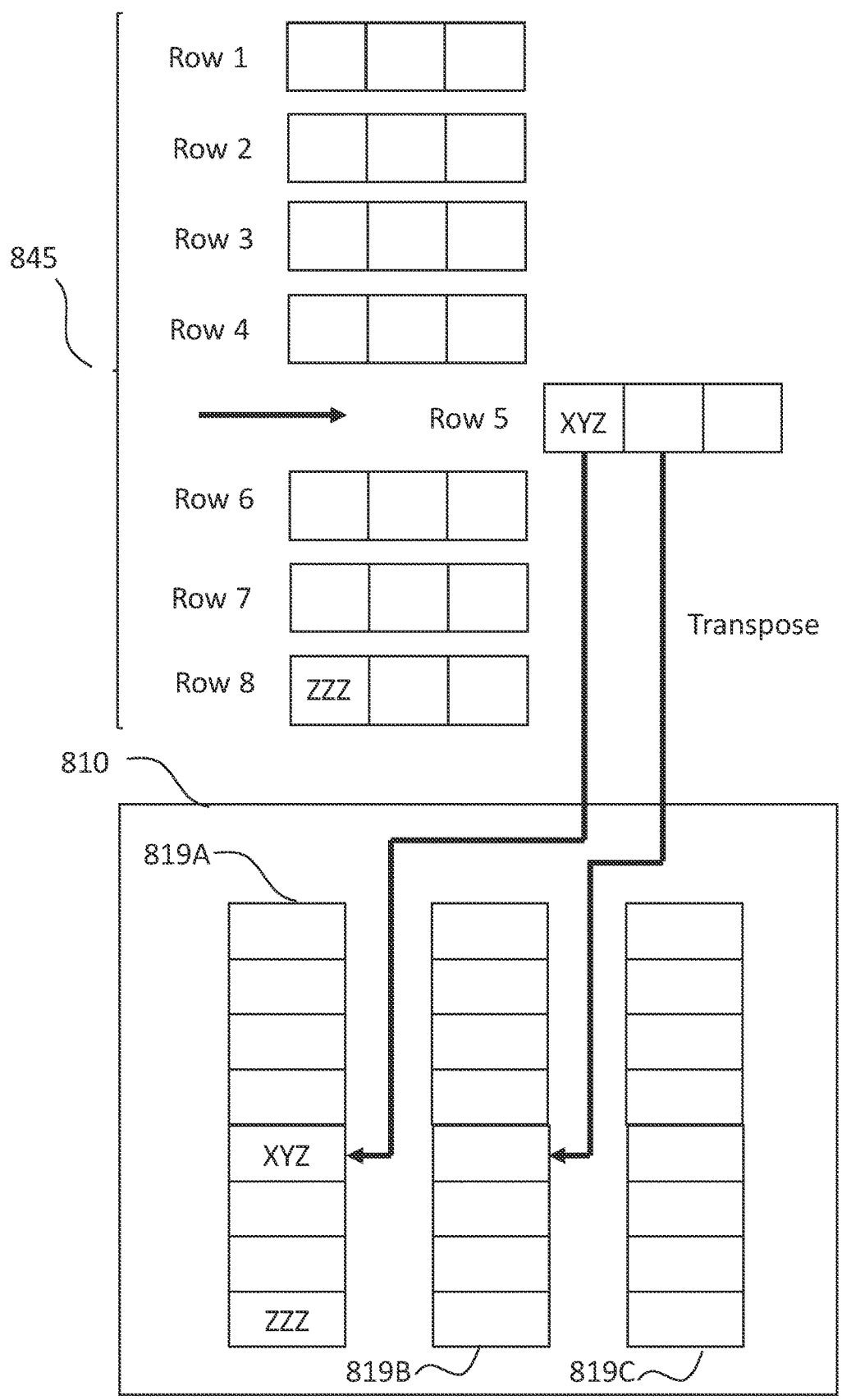
FIG. 8 is a schematic diagram illustrating reading of data items from a rowstore into memory, according to an example

Data items from rows may be transferred into column vectors in volatile memory for further processing and manipulation. For data items read from a columnstore this is a simple step where the data items from a column file may be transferred directly into a column vector. If however the data items are read from a rowstore, they must be converted into column vector format. This process is illustrated in FIG. 8 where for example if data item XYZ matches a search parameter, data items from the rest of the row (row 5) are read from row file of rowstore 845. Each data item from that row is then inserted into corresponding column vectors 819A, 819B, 819C in the volatile memory 810. This process is repeated for the rows of each data item matching the search parameters to build up the column vectors in the volatile memory. The deletion map for each segment will also be updated to indicate that these rows are now deleted/inactive/not current for the segment. Alternatively, the search itself may utilize the columnstore (or secondary index) to identify rows matching the search parameter(s) and then use the rowstore to read the matching rows.

Figure 9:
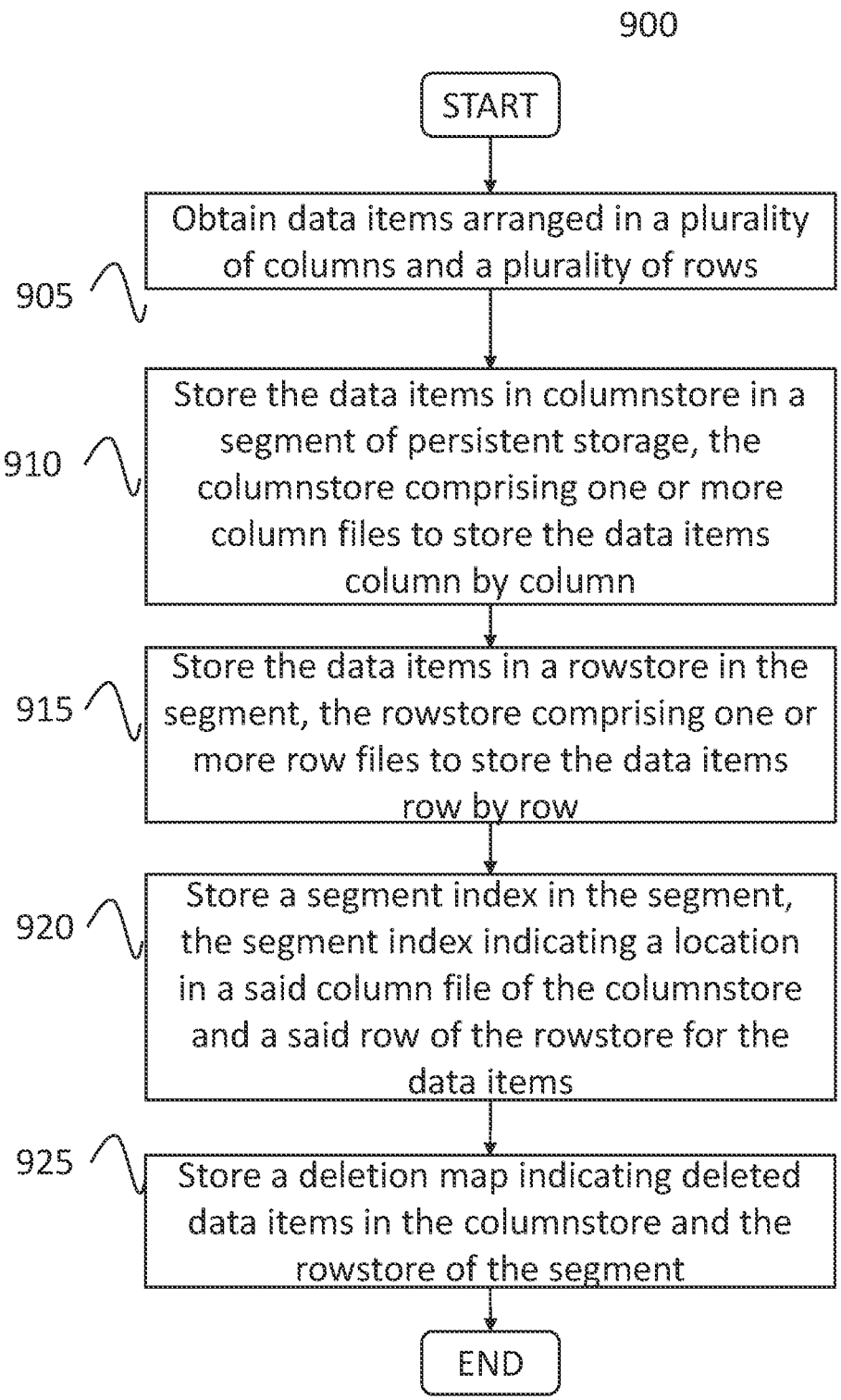
FIG. 9 is a flow chart of a method of storing data items in a columnstore and a rowstore, according to an example.

FIG. 9 illustrates a method of storing data items that may form part of a database. The method 900 may be performed by a database management system or any other suitable data handling system.

At 905, the method obtains data items arranged in a plurality of columns and a plurality of rows. The data items may be numbers, text, images and any other type of data and may be logically arranged as part of a table of a database such as a relationship database. The data items may relate to any suitable application, for example customer and sales data for businesses, posting records from social media platforms, engineering and scientific data processing. The data items may be obtained from users, owners or operators of a database, migration or transfers from other databases, data brokers or streaming platforms. The data items may be received into a volatile memory and be manipulated for storage, for example by arranging into the appropriate database tables. The data items may also be obtained from storage managed by the database management system and represent part of the database which needs updating.

At 910, the method stores at least some of the data items in a columnstore in a segment of persistent storage, the columnstore comprising one or more column files to store the data items column by column. The persistent storage may comprise a magnetic disk system for example and is partitioned into segments which may be able to store up to 1,000,000 rows of data items each. Each segment will comprise blocks of storage that may be used to store the data items in different formats depending on the architecture, hardware and operation of the persistent storage. The segments may be of different sizes and may have a maximum size, with smaller segments being merged in the background for improved efficiency of operation of the database management system. All or a group of rows of the obtained data items may be allocated to a segment, with additional rows of data items allocated to one or more other segments. All data items in a row will be allocated to the same segment.

As previously described, the columnstore comprises column files in which respective columns are stored in a compressed and encoded format. The data items are stored column-by-column in the column files. In other words, a first column of data items in a group of rows is stored in a column file, then a second column of data items is stored in a second column file and so on until all rows of the group of rows of obtained data items allocated to the segment are stored in column files. In some examples, data items from more (or less) than one column may be stored in a column file.

At 915, the method stores at least some of the data items in a rowstore in the segment of persistent storage, the rowstore comprising one or more row files to store the data items row by row. As previously described, the rowstore comprises row files in which respective rows are stored in a compressed and encoded format. The data items are stored row-by-row in the row files. In other words, a first row of data items in the group of rows is stored in a row file, then a second row of data items is stored in a second row file and so on until all rows of the group of rows of obtained data items allocated to the segment are stored in row files. In some examples, more (or less) than one row may be stored in a row file, for example two or more rows may be concatenated in one row file. In this example, the location reference or indicator 352 in the segment index will be used with a pointer file or other metadata associated with the rowstore row files to map the location reference or indicator 352 to a physical location in the row file.

In some examples, all data items in a group of rows to be stored in a segment are stored in both the columnstore and the rowstore, however it is possible that all of these data items may be stored in one of the columnstore or rowstore and only a subset of these data items may be stored in the other format, the rowstore or the columnstore. For example, large data items such as images may only be stored in the columnstore and not in the rowstore; or vice versa. Similarly, data items that are not frequently returned in queries may be stored in only one of the columnstore or rowstore.

At 920, the method stores a segment index in the segment, the segment index indicating a location of data items in both the columnstore and the rowstore. For example, a row indicator may be used to point to the data item in a column file in the columnstore and to a row in the rowstore. The segment index provides a location for respective data items in both the columnstore and the rowstore. The locations may correspond to storage block addresses in the segment, or any other suitable logical pointer which may or may not be used in conjunction with storage block addresses or other physical location pointers in associated metadata associated with the columnstore and/or rowstore.

Where row indicators are used, the data items are arranged in row order in both the columnstore and the rowstore—that is the order of the rows following whatever sorting or ordering may have occurred in the obtained data items. The data items are stored in the columnstore and rowstore in the same row order—that is in the column files, data items are stored in column format but with the data items from each row of the column in the same order as the rows are stored in the rowstore. The segment index in this situation can utilize the row number as the location for both the rowstore and the columnstore. The segment index may also comprise an offset to point more directly to the data item in the row file.

The use of a segment index indicating a common location reference in both the columnstore and the rowstore for a particular data item further integrates the columnstore and rowstore meaning that the data items in each are tightly coupled and synchronized reducing the risks of errors in the database management system due to the data items being out of date, incorrectly stored or referenced. In other words, using the same row indicator as the segment index for both columnstore and rowstore further integrates these data stores and reduces the possibility of database management processing errors such as the index pointing to different data items in the columnstore and the rowstore.

At 925, the method stores a deletion map indicating deleted data items in the columnstore and the rowstore of the segment. The deletion map may be in the form of a bitmap which simply indicates whether a particular logical location, in both the columnstore and the rowstore, corresponds to a deleted data item. Where a row indicator is used as the location, a simple two-column bitmap map be employed which further simplifies operation of the database management system.

By storing data items in both columnstore and rowstore formats, interactions with the database using either of these formats can be selected depending on which is better optimized for a particular process. For example, analytical processing involving scanning large numbers of data items with high selectivity in one or two columns is likely to benefit from utilizing the columnstores of the segments. Because the data items are stored in each segment in both columnstore and rowstore, selection of rowstore or columnstore can be done at the segment level—for example based on the selectivity of a filter parameter in each segment. Some queries with low selectivity may benefit from accessing data items using the rowstore as it is easier to access all data items in a row using this format. This reduces I/O cost for such queries, compared to accessing data items for a row from a number of column files. The selection of rowstore or columnstore per segment can be handled dynamically, for example as results for a query accumulate and evolve, it may become more efficient to subsequently select rowstore or columnstore in subsequent segments according to different criteria.

Figure 10:
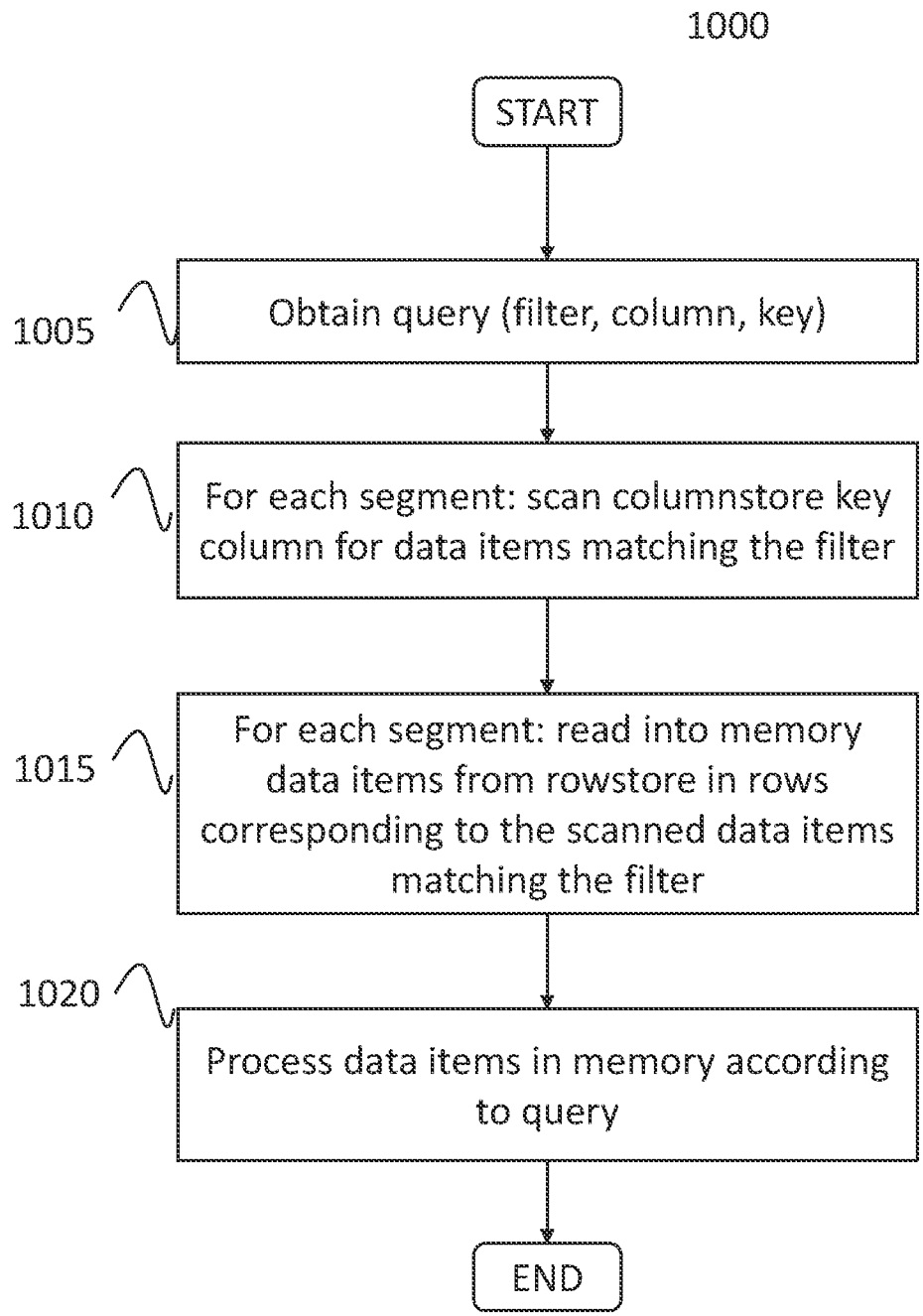
FIG. 10 is a flowchart of a method of processing a query using a columnstore and a rowstore, according to an example.

FIG. 10 illustrates processing a query according to an example. The method 1000 may be implemented in a database management system as previously described, and at 1005 comprises obtaining a query. The query may specify one or more filter parameters, for example:

SELECT Surname, Address
FROM Customer
WHERE Accumulated Purchases>1000

Here the data items from the Surname and Address columns of the Customer table are selected if their number or value in Accumulated Purchases exceeds $1000. This may be useful for offering these customers discounts or thanking them for their loyalty.

At 1010, the method may scan the Accumulated Purchases column of each segment for data items matching the ">1000" filter parameter or condition. This may be achieved most efficiently by scanning the corresponding column file in the columnstore of each segment.

At 1015, the method may read into memory data items from rows where this condition is met. This process may be achieved most efficiently by reading into volatile memory the data items from each matching row file—in some examples this may be simply implemented using the row indicator which is common to both the row files and column files of each segment so the row files corresponding to the matches found in the Accumulated Purchases column file can be easily identified.

At 1020, the method processes the data items in memory according to further requirements of the query such as emailing those customers or updating their loyalty rating in another table for example.

Figure 11:
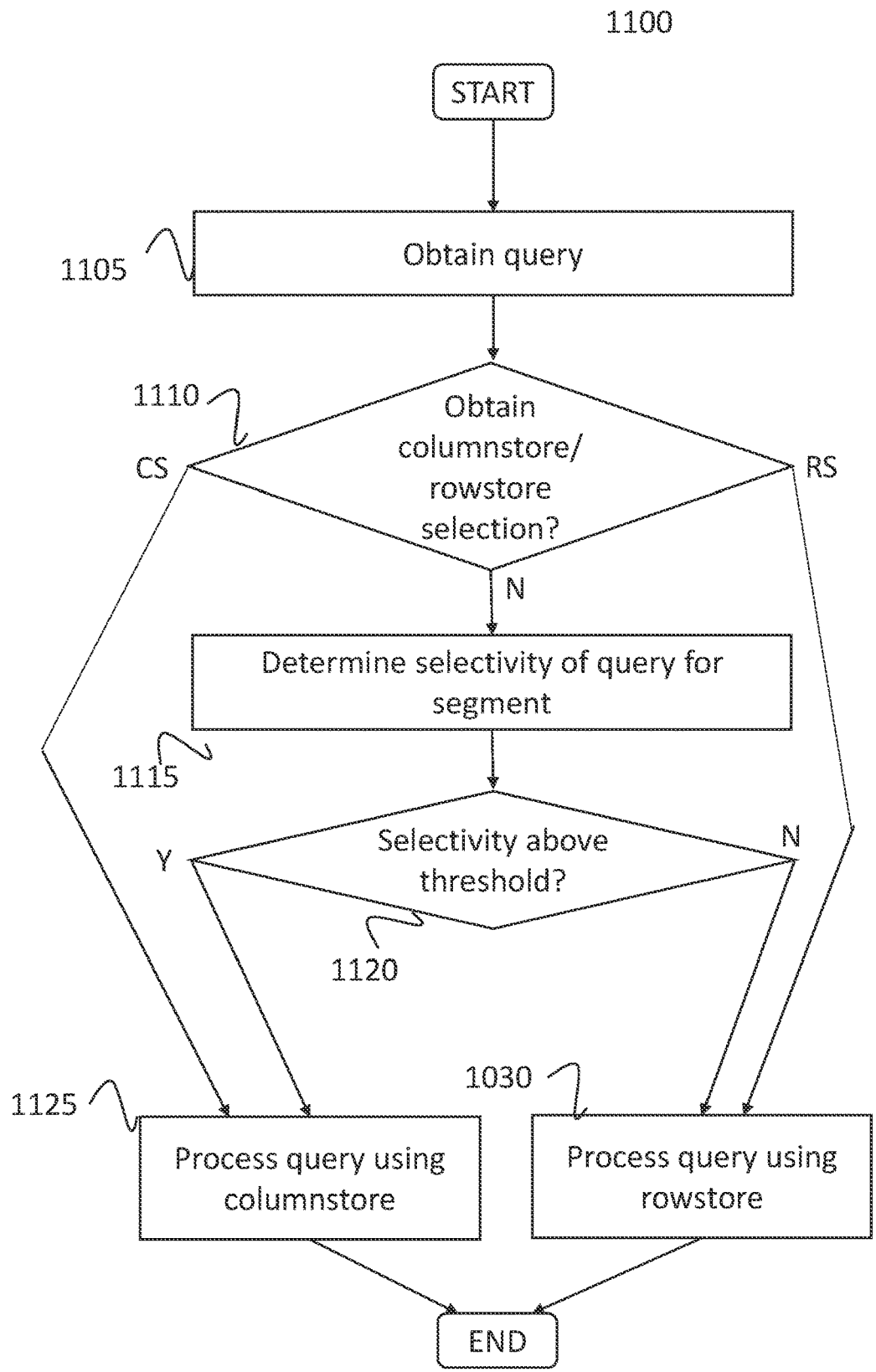
FIG. 11 is a flowchart of a method of processing a query using a columnstore and a rowstore, according to an example.

FIG. 11 illustrates processing a query according to an example. The method 1100 may be implemented in a database management system as previously described, and at 1105 comprises obtaining a query. For simplicity, the previous query is used as an example:

SELECT Surname, Address
FROM Customer
WHERE Accumulated Purchases >1000

Here the data items from the Surname and Address columns of the Customer table are selected if their number or value in Accumulated Purchases exceeds $1000.

At 1110, columnstore or rowstore is selected for processing this query. This may be instructed by a user of the database, or it may be determined from the selectivity of the query—that is the proportion of data items that match the query parameter compared with the total number of data items. Other criteria may alternatively be used for selecting between columnstore and rowstore. For example, if the projection of a query is to select a large (or small) number of columns, then rowstore (or columnstore) may be selected. For example, for the query 'SELECT Surname, Address FROM . . . WHERE . . . ', data may be read from columnstore as reading two separate column files shouldn't be too expensive. But if we do 'SELECT Surname, Firstname, Telephone, Address, Zip Code, Country, State, . . . FROM . . . ' then it may make more sense to load from the rowstore as we avoid opening and reading a large number of column files.

If the columnstore is selected, the method moves to 1125 where the query is processed using the columnstore of each segment. If the rowstore is selected, the method moves to 1030 where the query is processed using the rowstore of each segment.

Alternatively, at 1115 the method determines the selectivity of the query parameter for each segment. At 1120, the method determines whether the selectivity for a current segment is above a threshold, for example 25%. If the selectivity is "high", the method moves to 1125 where the query is processed using the columnstore of the segment. If however the selectivity is below the threshold, the method moves to 1030 where the query is processed using the rowstore of the segment. The method may then repeat this process for each segment holding data items for the Customer table.

Examples provide a number of advantages including 1:1 mapping between data items in the columnstore and rowstore of the segments. This compares with other systems which may have separate ranges of a table in different formats requiring moving data items between formats and/or managing synchronization. By persisting the data items to disk, access to and management of the database is not bound by available volatile memory. Further by persisting the segment index in each segment, this does not need to be rebuilt on recovery and the full table is readily available in both formats, allowing for more consistent performance.

Building the rowstore with the columnstore allows for potential optimizations that don't exist when the rowstore and columnstore storage of a table are disjoint. Further, rather than store large columns off row in a heap, they may be kept in the highly optimized (and seekable) columnstore format. The decision of whether to include a given column in the rowstore of a segment can be made dynamically at runtime based on its actual size (and can vary from segment to segment). The 1:1 mapping between columnstore and rowstore means they can share the same deleted row bitmap. As a result, it can be determined which format to use at runtime based on the actual selectivity of the query rather than at query compile time using estimates.

Both formats can be used in the same scan. For example, a columnstore column could be used for filtering and then the rest of the columns can be read from the rowstore format. Additionally, a different format can be used for each segment during the scan based on the runtime selectivity results. This both decreases complexity in the query planner and provides better performance than both the range and replication-based systems.

Where all data items are in both columnstore and rowstore format, there is a much lower chance of hitting a performance cliff than range-based systems. The 1:1 logical mapping between rowstore and columnstore data items means they can share the same secondary index or indexes which leads to lower overhead compared to systems that have completely separate systems for columnstore and rowstore.

The 1:1 mapping between data items in the columnstore and rowstore of each segment is ensured by storing these in their respective segment at the same time, together with a segment index. This "inherent" synchronization and consistency between rowstore and columnstore formats avoids having to implement complex synchronization mechanisms to manage data items stored in separate systems.

The use of a row indicator for both rowstore and columnstore is effectively mapping the key to the row number so the rows are mapped one to one in the columnstore so that the row number in the columnstore and the rowstore point to the same tuple. Adding a row offset then enables quick lookup from row number to physical offset.

In other embodiments at least some aspects of the embodiments described herein may comprise computer processes performed in processing systems or processors. However, in some examples, embodiments may also extend to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method of storing data items arranged in a plurality of columns and a plurality of rows, the method comprising:

storing the data items in a columnstore in a segment of persistent storage, the columnstore comprising one or more column files to store the data items column by column;

storing the data items in a rowstore in the segment of persistent storage, the rowstore comprising one or more row files to store the data items row by row;

providing a common location reference for each data item, wherein the common location reference for a said data item indicates both a location of the said data item in a respective column file of the columnstore of the segment and a said row file of the rowstore of the segment in which the said data item is stored;

storing a segment index in the segment for the data items in the segment, the segment index being associated with the respective column file of the columnstore of the segment and comprising the common location references for the data items; and storing a deletion map in the segment using the common location references, the deletion map indicating data items deleted from the columnstore and the rowstore of the segment, wherein for the deletion map comprises, for each data item, an associated common location reference and a binary value indicating whether the associated data item has been deleted;

in response to a query to delete a data item from either the columnstore or the rowstore, simultaneously a) marking the data item as deleted from the columnstore and b) marking the data item as deleted from the rowstore by updating a binary value in the deletion map, such that the common location reference corresponding to the updated binary value identifies the location of the deleted data item in both the columnstore and the rowstore.

2. The method of claim 1, wherein the data items are stored in row order in the column files and the common location references are row indicators.

3. The method of claim 2, wherein the rowstore comprises respective row offset indexes to data items in the respective row files and wherein for each data item the segment index includes a respective row offset index.

4. The method of claim 1, wherein the segment is a first segment and wherein the method comprises, in response to a query to change a data item in either the columnstore or the rowstore, storing in a second segment changes to the data item previously stored in the first segment and updating a binary value in the deletion map that corresponds to a common location reference of the data item previously stored in the first segment to indicate that the previously stored data item has been deleted from the columnstore and the rowstore of the first segment.

5. The method of claim 1, comprising identifying a data item to be stored which is over a determined size, storing the identified data item in a separate file of the segment, including a pointer to the separate file for the identified data item in each of the column file and the row file of the segment.

6. The method according to claim 1, comprising storing groups of rows in respective segments.

7. The method of claim 6, comprising merging two segments by:
merging the column files in the two segments;
merging the row files in the two segments;
generating a segment index for the merged column files and the merged row files;
storing the merged column files, the merged row files and the segment index file to a new segment.

8. The method of claim 1, comprising processing a query by selecting between the columnstore and the rowstore.

9. The method of claim 8, wherein processing the query comprises selecting for each segment between the columnstore and the rowstore of said segment.

10. The method of claim 8, comprising selecting the columnstore for filtering based on a key, selecting the rowstore to read rows of data items based on the filtering.

11. The method of claim 8, wherein the selecting is dependent on the selectivity of the query for the data items in the segment.

12. The method of claim 1, comprising processing a query by reading data items from the rowstore and transposing said data items into column vectors in a volatile memory.

13. A non-transitory computer readable storage medium comprising computer-readable instructions which, when executed by a processor, cause the processor to:

store data items arranged in a plurality of columns and a plurality of rows in a segment of persistent storage having a columnstore comprising one or more column files to store the data items column by column;

store the data items in a rowstore in the segment of persistent storage, the rowstore comprising one or more row files to store the data items row by row;

provide a common location reference for each data item, wherein the common location reference for a said data item indicates both a location of the said data item in a respective column file of the columnstore of the segment and a said row file of the rowstore of the segment in which the said data item is stored;

store a segment index in the segment for the data items in the segment, the segment index being associated with the respective column file of the columnstore of the segment and comprising the common location references for the data items;

store a deletion map in the segment using the common location references, the deletion map indicating data items deleted from the columnstore and the rowstore of the segment, wherein the deletion map comprises, for each data item, an associated common location reference and a binary value indicating whether the associated data item has been deleted; and in response to a query to delete a data item from either the columnstore or the rowstore, simultaneously a) mark the data item as deleted from the columnstore and b) mark the data item as deleted from the rowstore by updating a binary value in the deletion map such that the common location reference corresponding to the updated binary value identifies the location of the deleted data item in both the columnstore and the rowstore.

14. A database system comprising:
at least one processor;
memory comprising a segment of persistent storage, the memory including computer code;
the memory and the computer program code being configured to, with the at least one processor, cause the database system to:
store data items arranged in a plurality of columns and a plurality of rows in the segment in a columnstore comprising one or more column files to store the data items column by column;
store the data items in a rowstore in the segment of persistent storage, the rowstore comprising one or more row files to store the data items row by row; provide a common location reference for each data item, wherein the common location reference for a said data item indicates both a location of the said data item in a respective column file of the columnstore of the segment and a said row file of the rowstore of the segment in which the said data item is stored;

store a segment index in the segment for the data items in the segment, the segment index being associated with the respective column file of the columnstore of the segment and comprising the common location references for the data items;

store a deletion map in the segment using the common location references, the deletion map indicating data items deleted from the columnstore and the rowstore of the segment, wherein the deletion map comprises, for each data item, an associated common location reference and a binary value indicating whether the associated data item has been deleted; and in response to a query to delete a data item from either the columnstore or the rowstore, simultaneously a) mark the data item as deleted from the columnstore and b) mark the data item as deleted from the rowstore by updating a binary value in the deletion map, such that the common location reference corresponding to the updated binary value identifies the location of the deleted data item in both the columnstore and the rowstore.

15. The database system of claim 14, configured to store the data items in row order in the column files and the common location references are row indicators.

16. The database system of claim 14, configured to store groups of rows in respective segments.

17. The database system of claim 14, configured to identify a data item to be stored which is over a determined size, storing the identified data item in a separate file of the segment, including a pointer to the separate file for the identified data item in each of the column file and the row file of the segment.

18. The database system of claim 14, configured to process a query by selecting between the columnstore and the rowstore.

* * * * *